US009535753B2

(12) United States Patent
Farhan et al.

(10) Patent No.: US 9,535,753 B2
(45) Date of Patent: Jan. 3, 2017

(54) CONTEXT AND OPTIMIZATION FRAMEWORK

(71) Applicant: DELL PRODUCTS L.P., Round Rock, TX (US)

(72) Inventors: Munif M. Farhan, Round Rock, TX (US); Yuan-Chang Lo, Austin, TX (US); Rocco Ancona, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 14/603,118

(22) Filed: Jan. 22, 2015

(65) Prior Publication Data

US 2016/0217009 A1    Jul. 28, 2016

(51) Int. Cl.
*G06F 9/46* (2006.01)
*G06F 9/50* (2006.01)
*G06F 9/48* (2006.01)

(52) U.S. Cl.
CPC .......... *G06F 9/5011* (2013.01); *G06F 9/4881* (2013.01)

(58) Field of Classification Search
CPC .............................. G06F 9/5011; G06F 9/4881

USPC ........................................................ 718/104
See application file for complete search history.

(56) References Cited

U.S. PATENT DOCUMENTS

2013/0232331 A1* 9/2013 Farhan ................ G06F 11/3006
                                                     713/100

* cited by examiner

*Primary Examiner* — Wei Zhen
*Assistant Examiner* — Lanny Ung
(74) *Attorney, Agent, or Firm* — Baker Botts L.L.P.

(57) ABSTRACT

Methods and systems for optimizing resources are disclosed. A method for optimizing resources may include aggregating a first data and a second data from a plurality of network resources into a context information set, deriving a complex context information set from an association of the first data and the second data in the context information set, receiving a resource request, generating an optimized resource request based on an optimization criteria, identifying a network resource to perform the optimized resource request based on the context information set and the complex context information set, executing an action with the network resource to fulfill the optimized resource request, and updating the context information set based on the action.

18 Claims, 4 Drawing Sheets

CONTEXT AND OPTIMIZATION FRAMEWORK

TECHNICAL FIELD

This disclosure relates generally to information handling systems and more particularly to a context and optimization framework.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In accordance with some embodiments of the present disclosure, a method for optimizing resources includes aggregating a first data and a second data from a plurality of network resources into a context information set. The method also includes deriving a complex context information set from an association of the first data and the second data in the context information set. The method further includes receiving a resource request. The method also includes generating an optimized resource request based on an optimization criteria. The method also includes identifying a network resource to perform the optimized resource request based on the context information set and the complex context information set. The method further includes executing an action with the network resource to fulfill the optimized resource request. The method also includes updating the context information set based on the action.

In accordance with some embodiments of the present disclosure, a non-transitory computer readable medium includes computer readable instructions which, when executed, aggregate a first data and a second data from a plurality of network resources into a context information set. The instructions also cause the processor to derive a complex context information set from an association of the first data and the second data in the context information set. The instructions also cause the processor to receive a resource request. The instructions also cause the processor to generate an optimized resource request based on an optimization criteria. The instructions also cause the processor to identify a network resource to perform the optimized resource request based on the context information set and the complex context information set. The instructions also cause the processor to execute an action with the network resource to fulfill the optimized resource request. The instructions also cause the processor to update the context information set based on the action.

In accordance with some embodiments of the present disclosure, an information handling system includes a processor, a memory communicatively coupled to the processor, and a resource optimization module. The resource optimization module includes computer readable instructions which, when executed, cause the processor to aggregate a first data and a second data from a plurality of network resources into a context information set. The instructions also cause the processor to derive a complex context information set from an association of the first data and the second data in the context information set. The instructions also cause the processor to receive a resource request. The instructions also cause the processor to generate an optimized resource request based on an optimization criteria. The instructions also cause the processor to identify a network resource to perform the optimized resource request based on the context information set and the complex context information set. The instructions also cause the processor to execute an action with the network resource to fulfill the optimized resource request. The instructions also cause the processor to update the context information set based on the action.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

As will be described in further detail, the inventors of the present disclosure have discovered methods and systems for context and optimization. The methods and systems aggregate and derive context information of coupled information handling systems in order to optimize resources across the various information handling systems.

Particular embodiments are best understood by reference to FIGS. 1-4 wherein like numbers are used to indicate like and corresponding parts.

Figure 1:
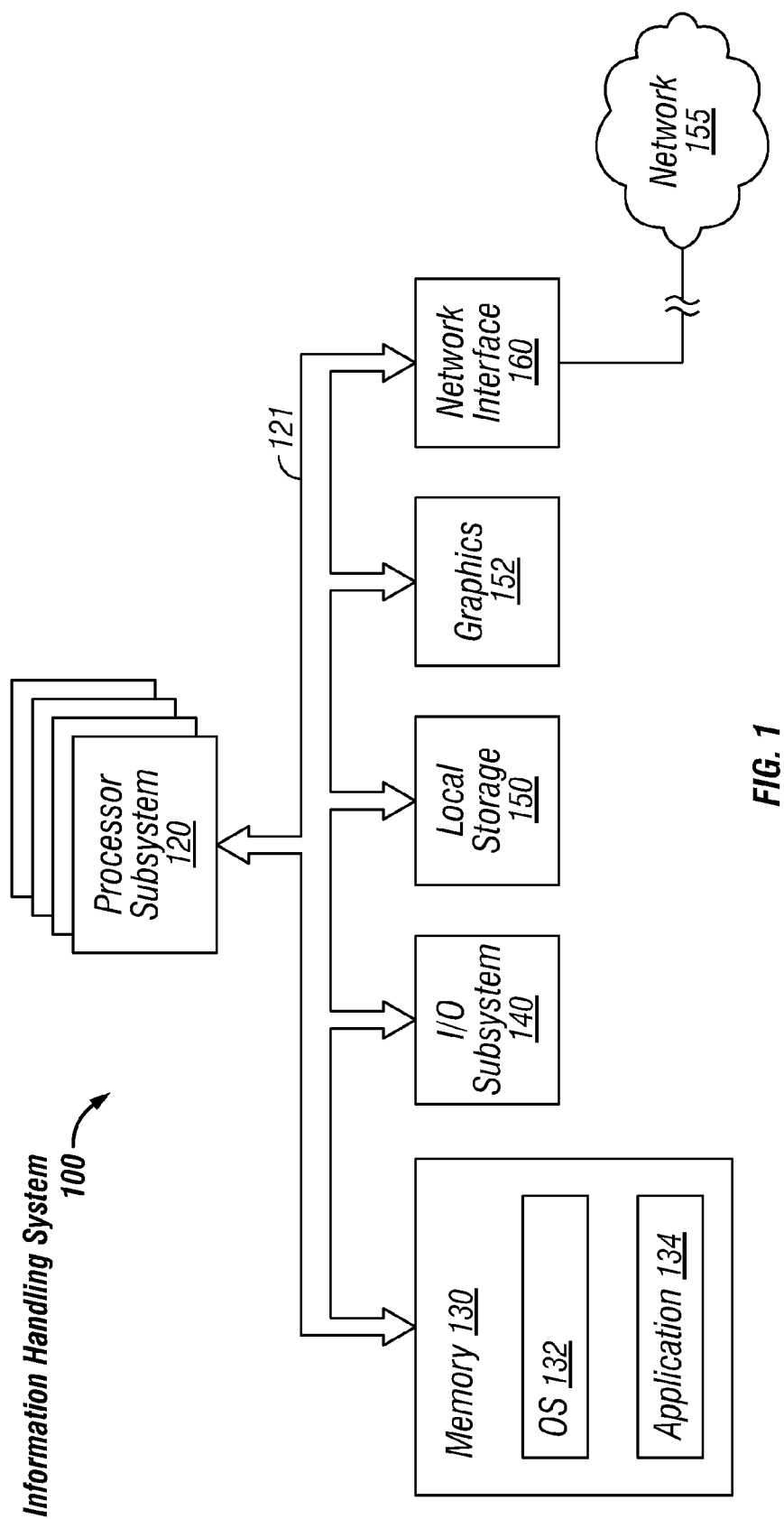
FIG. 1 illustrates a block diagram of selected elements of an embodiment of an information handling system, in accordance with some embodiments of the present disclosure.

FIG. 1 illustrates a block diagram depicting selected elements of an embodiment of information handling system 100, in accordance with some embodiments of the present disclosure. In particular embodiments, one or more information handling systems 100 perform one or more steps of one or more methods described or illustrated herein. In particular embodiments, one or more information handling systems 100 provide the functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate. Also shown with information handling system 100 is external or remote element network 155.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, graphics card 152, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to other information handling systems. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130 and/or another component of physical hardware 102). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132 and application 134. Operating system 132 may represent instructions executable by processor subsystem 120 to operate information handling system 100 after booting. It is noted that in different embodiments, operating system 132 may be stored at remote storage coupled to network 155 and may be accessed by processor subsystem 120 via network interface 160. Application 134 may represent instructions executable by processor subsystem 120 for implementing generic application functionality, which may include a user interface and/or access to computing resources, such as local storage resource 150, for example. Memory 130 may comprise random access memory (RAM), electrically erasable programmable read-only memory (EEPROM), a PCMCIA card, solid-state memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, solid-state memory, EEPROM, and/or another type of solid state storage media) and may be generally operable to store instructions and/or data. For example, local storage resource 150 may store executable code in the form of program files that may be loaded into memory 130 for execution.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

In operation, operating system 132 and/or application 134 may be configured to access a particular storage structure stored on local storage resource 150.

Figure 2:
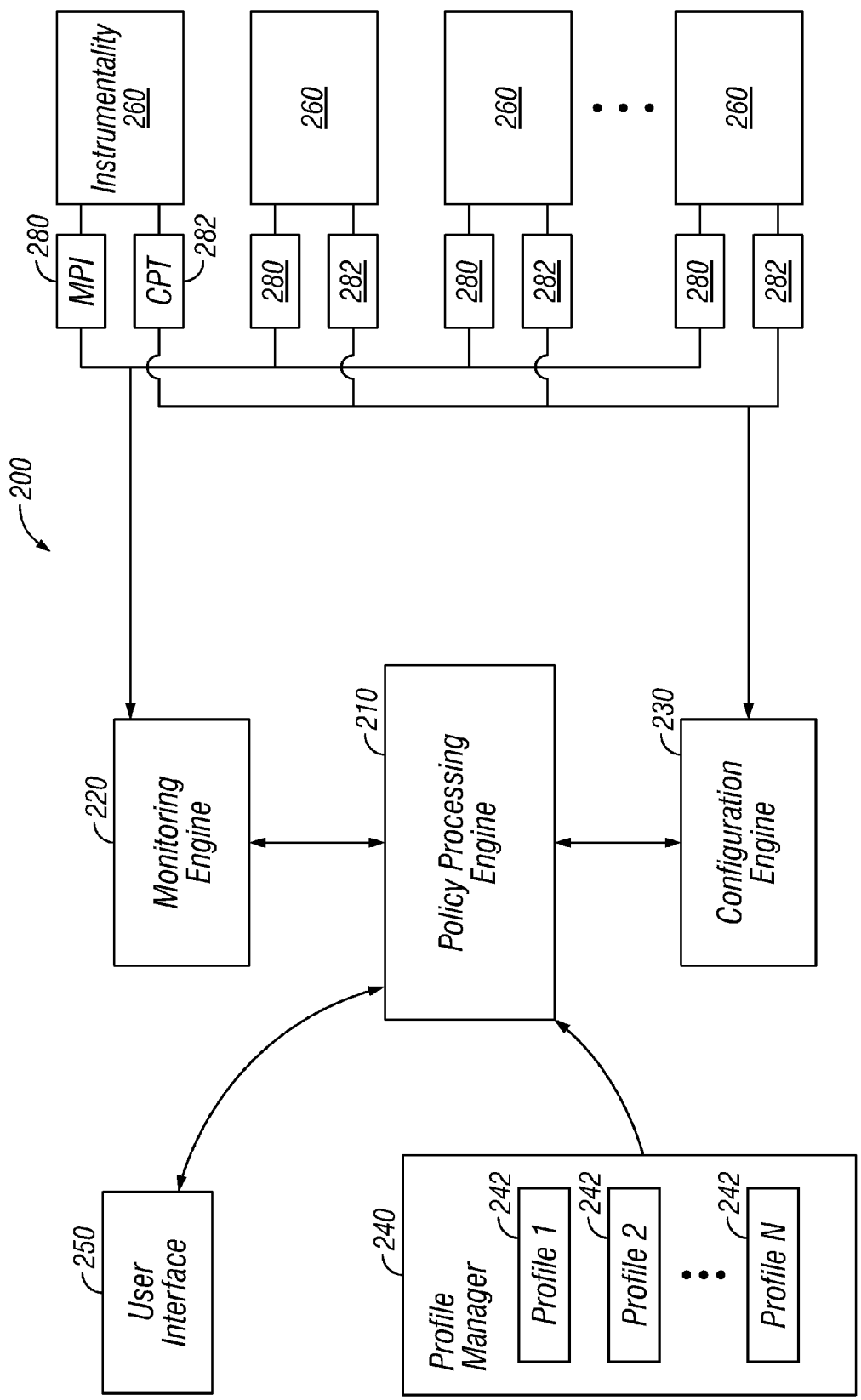
FIG. 2 is a block diagram of selected elements of an embodiment of a performance subsystem, in accordance with some embodiments of the present disclosure.

FIG. 2 illustrates a block diagram of an embodiment of a performance subsystem 200, in accordance with some embodiments of the present disclosure. Performance subsystem 200 may be configured to monitor and configure instrumentalities on an information handling system, including any embodiments of the information handling system 100 discussed in FIG. 1. Performance subsystem 200 may include any suitable combination or number of elements to perform the functionality described herein. As shown in FIG. 2, performance subsystem 200 may include a policy processing engine 210, monitoring engine 220, configuration engine 230, profile manager 240, and a user interface 250.

Performance subsystem 200 may include policy processing engine 210. In some embodiments, policy processing engine 210 may optimize an information handling system. In some embodiments, policy processing engine 210 may monitor various instrumentalities 260 of an information handling system. For example, policy processing engine 210 may be communicatively coupled to monitoring engine 220, thereby receiving information monitoring information on instrumentality 260. In particular embodiments, policy processing engine 210 may optimize an information handling system in accordance with policy. For example, policy processing engine 210 may receive policy information from profile manager 240. In some embodiments, policy processing engine 210 may configure instrumentalities 260. For example, policy processing engine 210 may be communicatively coupled to configuration engine 230 capable of configuring instrumentality 260. Policy processing engine 210 may be implemented in any suitable manner. For example, policy processing engine 210 may be implemented by code, analog or digital circuitry, instructions, libraries, shared libraries, software-as-a-service, functions, applications, scripts, and/or executables. In some embodiments, policy processing engine 210 may be implemented within an information handling system, including the information system that policy processing engine 220 is optimizing. In some embodiments, policy processing engine 210 may be implemented partially or wholly external of the information handling system it is optimizing. Although illustrated as a single element in FIG. 2, policy processing engine 210 may be implemented through a combination of elements. In some embodiments, policy processing engine 210 may be configured to optimize one or more information handling systems.

Performance subsystem 200 may also include monitoring engine 220. In one embodiment, monitoring engine 220 may be configured to monitor various aspects of an information handling system. In particular embodiments, monitoring engine 220 may monitor instrumentalities 260 comprising an information handling system. As an example and not by way of limitation, monitoring engine 220 may monitor a central processing unit, memory, graphics card, local storage, power controller, thermal controller, or display of an information handling system. In particular embodiments, monitoring engine 220 may be communicatively coupled to instrumentality 260 through monitoring plug-in 280. Monitoring engine 220 may be implemented in any suitable manner. For example, monitoring engine 220 may be implemented by code, analog circuitry, digital circuitry, instructions, libraries, shared libraries, software-as-a-service, functions, applications, scripts, or executables. In some embodiments, monitoring engine 220 may be implemented within an information handling system, including the information system that monitoring engine 220 is monitoring. In particular embodiments, monitoring engine 220 may be implemented partially or wholly external of the information handling system it is monitoring. Although illustrated as a single element, monitoring engine 220 may be implemented through a combination of elements. In some embodiments, monitoring engine 220 may be configured to monitor one or more information handling systems.

Performance subsystem 200 may also include monitoring plug-in (MPI) 280. In one embodiment, MPI 280 may be configured to communicatively couple monitoring engine 220 to instrumentality 260. In particular embodiments, MPI 280 may be configured to enable monitoring engine 220 to monitor various aspects of instrumentality 260. As an example and not by way of limitation, MPI 280 may enable monitoring engine 220 to monitor the capacity, temperature, version, status, or utilization of instrumentality 260. MPI 280 may be implemented in any suitable manner, including hardware or software. For example, MPI 280 may be implemented as a digitally signed dynamic link library (DLL) communicating with instrumentality 260 through a device driver configured to instrumentality 260. Although MPI 280 is illustrated as a single element, MPI 280 may be implemented through a combination of elements. In some embodiments, performance subsystem 200 may include one or more MPI 280 coupled to each instrumentality 260 within the information handling system. In particular embodiments, MPI 280 may communicatively couple monitoring engine 220 to more than one instrumentality 260.

Performance subsystem 200 may also include a configuration engine 230. In some embodiments, configuration engine 230 may be configured to configure various aspects of an information handling system. In particular embodiments, configuration engine 230 may configure instrumentalities 260 comprising an information handling system. As an example and not by way of limitation, configuration engine 230 may configure a central processing unit, memory, graphics card, local storage, power controller, thermal controller, or display of an information handling system. In particular embodiments, configuration engine 230 may be communicatively coupled to instrumentality 260 through configuration plug-in 282. Configuration engine 230 may be implemented in any suitable manner. For example, configuration engine 230 may be implemented by code, analog circuitry, digital circuitry, instructions, libraries, shared libraries, software-as-a-service, functions, applications, scripts, or executables. In some embodiments, configuration engine 230 may be implemented within an information handling system, including the information handling system that configuration engine 230 is configuring. In particular embodiments, configuration engine 230 may be implemented partially or wholly external of the information handling system it is configuring. Although illustrated as a single element, configuration engine 230 may be implemented through a combination of elements. In some embodiments, configuration engine 230 may be configured to configure one or more information handling systems.

Performance subsystem 200 may also include configuration plug-in (CPI) 282. In one embodiment, CPI 282 may be configured to communicatively couple configuration engine 230 to instrumentality 260. In particular embodiments, CPI 282 may be configured to enable configuration engine 230 to configure various aspects of instrumentality 260. As an example and not by way of limitation, CPI 282 may enable configuration engine 230 to configure instrumentality 260 to reduce power consumption, power up/down, increase performance, or update firmware. CPI 282 may be implemented in any suitable manner, including hardware or software. For example, CPI 282 may be implemented as a digitally signed dynamic link library (DLL) communicating with instrumentality 260 through a device driver configured to instrumentality 260. Although CPI 282 is illustrated as a single element, CPI 282 may be implemented through a combination of elements. In some embodiments, performance subsystem 200 may include one or more CPI 282 coupled to each instrumentality 260 within the information handling system. In particular embodiments, CPI 282 may communicatively couple configuration engine 230 to more than one instrumentality 260.

With the ability to monitor and configure instrumentality 260, performance subsystem 200 may be configured to optimize an information handling system. In some embodiments, policy processing engine 210 may analyze and act in accordance with one or more profiles 242 from profile manager 240. In some embodiments, profile manager 240 may contain one or more profiles 242 for optimizing instrumentality 260 of the information handling system. In particular embodiments, profile 242 may be created, modified, and/or deleted from profile manager 240 through user interface 250. For example, a user may select profile 242 by way of user interface 250 to optimize an information handling system for, among other things, power conservation, performance, and/or network efficiency. In certain embodiments, profile 242 may be selected, created, modified, and/or removed from profile manager 240 by the manufacturer of the information handling system or instrumentality 260. For example, the manufacturer of a computer system may provide profile 242 for, among other things, conserving power consumption, performance, and/or network usage. In particular embodiments, profile 242 may be selected, created, modified, and/or removed from profile manager 240 by policy processing engine 210. For example, policy processing engine 210 may select profile 242 for conserving power upon detecting that a computer system has been unplugged from a power source. In some embodiments, profile manager 240 may comprise a collection of profiles 242 (e.g. a machine-readable like extensible markup language, comma-separate values, database, etc.) accessible to policy processing engine 210. In some embodiments, profile manager 240 may be an application configured to manage profiles 242 and communicate profile information to policy processing engine 210. In some embodiments, a plurality of policy engines 210 may access profile 242 from the same profile manager 240. In certain embodiments, policy engine 210 may utilize profile 242 from profile manager 240 located on different information handling system.

In some embodiments, profile 242 may include a trigger condition that, when met, causes a corresponding profile 242 to take effect. As an example and not by way of limitation, profile 242 may contain a trigger condition for the execution application of a particular program. In some embodiments, profile 242 may include settings to implement upon a trigger condition occurring. In some embodiments, setting in profile 242 may represent changes to occur at instrumentality 260. For example, when the program of a trigger condition executes, settings at one or more instrumentalities 260 change in accordance with profile 242, independent of any input from a user. In some embodiments, profile 242 may comprise settings for any aspect of instrumentalities 260. For example, profile 242 may include settings for basic input/output system (BIOS), drivers, and/or operating system layers designed to maximize performance of an application. Further, profile 242 may contain, among other things, settings for threading on a central processing unit (CPU), number of cores operating on multi-core CPU, process priority, power, or fan speeds. In some embodiments, profile 242 may include a trigger condition related to instrumentality 260. For example, profile 242 may be triggered when battery instrumentality 260 reaches a certain percentage of remaining battery life. When this trigger is met, processing engine 210 may adjust settings at one or more instrumentalities 260 (e.g., reducing screen brightness on a display, reducing the number of cores operating on a multi-core CPU, reducing the sleep time for a processor, etc.) accordance with profile 242 in order to reduce power consumption. In certain embodiments, policy processing engine 210 may detect the occurrence of trigger condition in profile 242 with monitoring engine 220. In certain embodiments, policy processing engine 210 may affect settings contained in profile 242 with configuration engine 230.

In some embodiments, performance system 200 may be configured to automatically scale and adapt to changes within the information handling system, profile manager 240, and/or input from user interface 250. For example, monitoring engine 220 may detect when a new instrumentality 260 is added to the information handling system. In response, configuration engine 230 may download and configure drivers and/or libraries so that policy processing engine 210 may monitor or configure instrumentality 260. In some embodiments, profiles 242 may be created, modified, and/or deleted from profile manager 240. Accordingly, in some embodiments, performance system 200 may be configured to scale and adapt as a result of changes to an information handling system. In some embodiments, performance system 200 may be configured to scale and adapt as a result of changes to an information handling system, automatically, without any prompting by a user.

Although the functionality of policy processing engine 210, monitoring engine 220, configuration engine 230, and profile manager 240 are described as separate elements as shown in FIG. 2, the functionality of each of these may be implemented by any suitable portion of system performance system 200.

Figure 3:
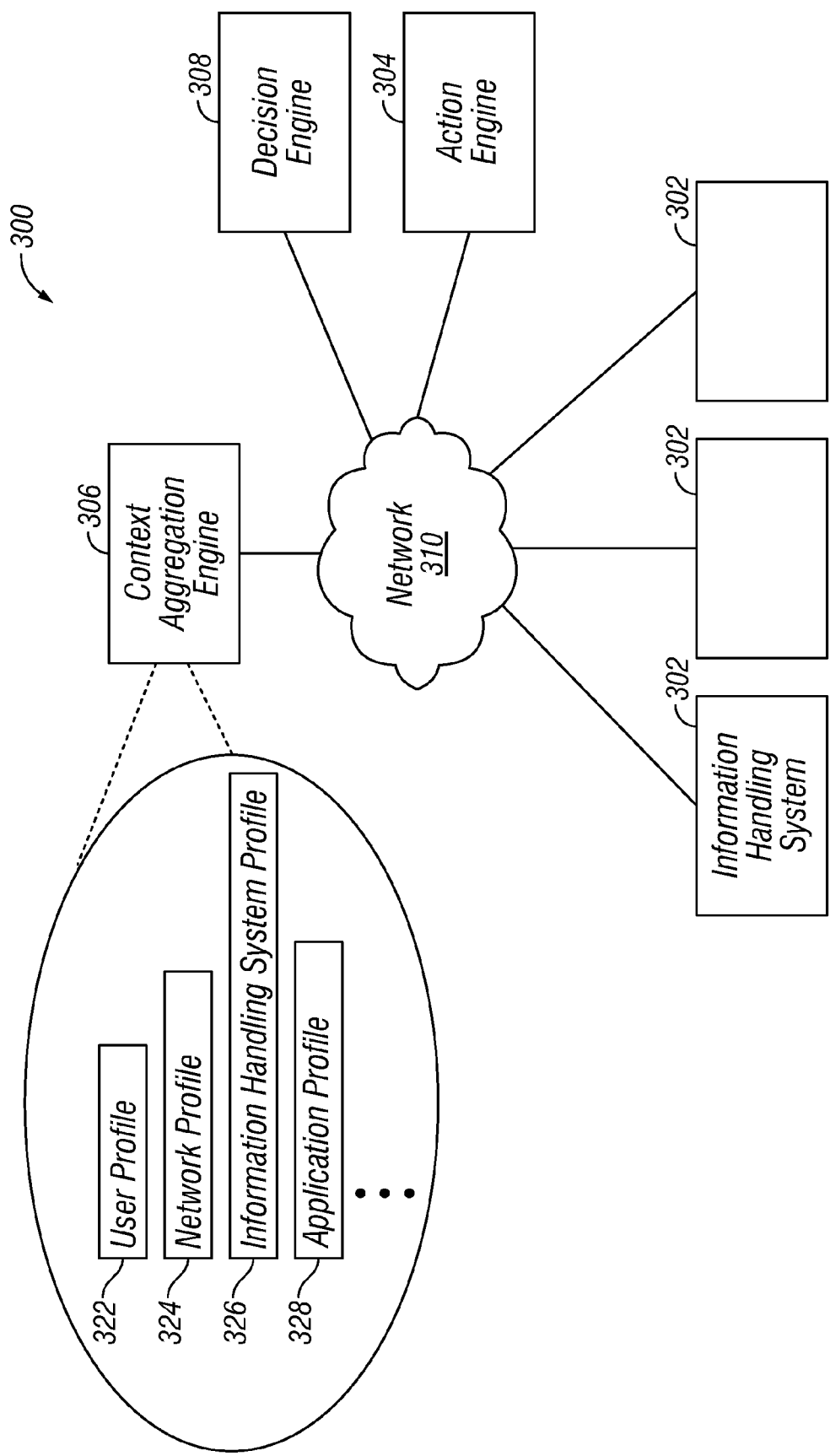
FIG. 3 is a block diagram of selected elements of an embodiment of a distributed activity optimization ecosystem, in accordance with some embodiments of the present disclosure.

FIG. 3 is a block diagram of selected elements of an embodiment of a distributed activity optimization ecosystem 300, in accordance with some embodiments of the present disclosure. In one embodiment, distributed activity optimization ecosystem 300 may optimize resources between multiple information handling systems 302. Distributed activity optimization ecosystem 300 may include one or more information handling systems 302, a context aggregation engine 306, a decision engine 308, and an action engine 304. In some embodiments, some or all of the elements of distributed activity optimization ecosystem 300 may be communicatively coupled via a network 310.

Distributed activity optimization ecosystem 300 may include a context aggregation engine 306. In one embodiment, context aggregation engine 306 may be configured to aggregate context information for resource optimization.

In some embodiments, context aggregation engine 306 may aggregate information from various information handling systems 302. For example, context aggregation engine 306 may aggregate information on information system 302 as received from a performance subsystem described in FIG. 2. Information from a performance subsystem of information handling system 302 may include, among other things, location, capacity, temperature, version, status, and/or utilization of instrumentalities of information handling system 302. In some embodiments, context aggregation engine 306 may be configured to aggregate information related to information handling system 302 into an information handling system profile 326.

In some embodiments, context aggregation engine 306 may be configured to aggregate information from network 310. For example, information from network 310 may include, among other things, network topology, status, utilization, or maintenance information related to network 310. In some embodiments, context aggregation engine 306 may be configured to aggregate information related to network 310 into a network profile 324.

In some embodiments, context aggregation engine 306 may aggregate data on a user of information handling systems 302. As an example and not by way of limitation, user information may include user preferences, usage, classification, status, location, or schedule. In some embodiments, context aggregation engine 306 may be configured to aggregate user data into a user profile 322.

In some embodiments, context aggregation engine 306 may be configured to aggregate information on applications. Such application information may include, for example, resource requirements, resource usage, settings, status, or version. In some embodiments, context aggregation engine 306 may be configured to aggregate application information into application profile 328.

In some embodiments, context aggregation engine 306 may be configured to derive complex context information from distributed activity optimization ecosystem 300. In some embodiments, context aggregation engine 306 may be configured to derive complex context information from data stored across various information handling systems in distributed activity optimization ecosystem 300. For example, context aggregation engine 306 may process files, databases, locations, or any other relevant data to derive complex context information. In some embodiments, context aggregation engine 306 may be configured to derive complex context information from changes to distributed activity optimization ecosystem 300. For example, context aggregation engine 306 may derive complex content information based on the addition or of removal of information handling systems 302 from distributed activity optimization ecosystem 300. In some embodiments, context aggregation engine 306 may be configured to derive complex context information from context information aggregated by context aggregation engine 306. For example, context aggregation engine 306 may derive complex content information from user profile 322, network profile 324, information handling system profile 326, application profile 328, or any other profile or data previously aggregated by context aggregation engine 306. In some embodiments, context aggregation engine 306 may be configured to derive complex context information from predefined data associations. For example, associations between calendar entries and user location may be predefined (e.g. a machine-readable like extensible markup language, comma-separate values, database, etc.) so that context aggregation engine 306 understands the relationship between the information. In some embodiments, context aggregation engine 306 may be configured to determine associations between data based on available context information. For example, context aggregation engine 306 may use artificial intelligence to automatically determine associations between otherwise disjointed data.

In some embodiments, context aggregation engine 306 may be configured to derive complex user context information. For example, context aggregation engine 306 may process calendars, emails, contacts, or organizational charts to derive complex context information on a user. As an example and not by way of limitation, context aggregation engine 306 may derive future movements of a user based on previous/current location data, calendar entries, resource usage, or by the location of a personal electronic device associated with the user. As another example, context aggregation engine 306 may derive user preferences (e.g., a user usually uses an email application on a particular cellular phone at certain times of the day, user usually maintains the volume off on a particular device, etc.). As yet another example, context aggregation engine 306 may determine that two more users are on the same work team based on the processing of human resource records. As another example, context aggregation engine 306 may determine that two or more users will be in close proximity to each other based on calendar entries of the two users. In some embodiments, context aggregation engine 306 may update user profile 322 with derived complex context information.

In some embodiments, context aggregation engine 306 may be configured to derive complex network context information. For example, context aggregation engine 306 may process calendars, emails, or maintenance request records to derive future network availability, usage, or reliability. As an example, a high number of maintenance request related to a particular connection on network 310 may indicate reliability issues. As another example, context aggregation engine 306 may derive network security information based in part on network access logs. In some embodiments, context aggregation engine 306 may be configured to update network profile 324 with derived complex context information.

In some embodiments, context aggregation engine 306 may be configured to derive complex information handling system context information. For example, context aggregation engine 306 may process system files, communications, and maintenance request records to derive security, usage, or reliability context for information handling system. As an example and not by way of limitation, an outdated operating system may indicate security or reliability concerns for a particular information handling system 302. In some embodiments, context aggregation engine 306 may be configured to update information handling system profile 324 with derived complex context information.

In some embodiments, context aggregation engine 306 may be configured to derive complex application context information. For example, context aggregation engine 306 may process application usage records, determine for example, average run time of an application, user statistics, expected performance, optimal settings, peak usage time, or any other information related to an application. In some embodiments, context aggregation engine 306 may be configured to update aggregate application profile 328 with derived complex context information.

In particular embodiments, context aggregation engine 306 may be configured to communicate context information with other elements in distributed activity optimization ecosystem 300. For example, context aggregation engine 306 may be configured to communicate context information to decision engine 308, action engine 304, or any other element in distributed activity optimization ecosystem 300. In some embodiments, context aggregation engine 306 may communicate context information with other elements via network 310. As an example and not by way of limitation, information communicated by context aggregation engine 306 may include information from user profile 322, network profile 324, information handling system profile 326, application profile 328, or any other information relevant to optimizing resources within distributed activity optimization ecosystem 300.

In some embodiments, context aggregation engine 306 may be configured to detect and dynamically adjust to changes in distributed activity optimization ecosystem 300. For example, context aggregation engine 306 may detect a new information handling system 302 connecting to network 310. In response to new information handling system 302 connecting to network 310, context aggregation engine 306 may begin aggregating context information from new information handling system 302. In some embodiments, context aggregation engine 306 may be configured to communicate with information handling system 302. For example, context aggregation engine 306 may request information handling system 302 submit information for context aggregation. As another example and not by way of limitation, context aggregation engine 306 may be configured to detect a portable electronic device (e.g., cellphone, laptop, PDA, etc.) communicatively coupling (e.g., by wired, wireless, Bluetooth, or any other communicative means) to other information handling systems 302. Context aggregation engine 306 may instruct the portable electronic device to download and install software to support a performance system 200 described in FIG. 2. In some embodiments, context aggregation engine 306 may update appropriate profiles (e.g., user profile 322, network profile 324, information handling system profile 326, and application profile 328) upon detecting changes in distributed activity optimization ecosystem 300. For example, context aggregation engine 306 may be configured to update information handling system profile 326 upon detecting information handling system 302 joining or leaving network 310.

Context aggregation engine 306 may be implemented in any suitable manner. For example, context aggregation engine 306 may be implemented by code, analog circuitry, digital circuitry, instructions, libraries, shared libraries, software-as-a-service, functions, applications, scripts, or executables. In some embodiments, context aggregation engine 306 may be part of an information handling system 302. In some embodiments, context aggregation engine 306 may be distributed across one or more information handling systems 302. Although context aggregation engine 306 is illustrated as a single element, context aggregation engine 306 may be implemented through a combination of elements. For example, in one embodiment, context aggregation engine 306 may be distributed across multiple information handling systems 302 within network 310.

Distributed activity optimization ecosystem 300 may include decision engine 308. In one embodiment, decision engine 308 may be configured to determine an optimal distribution of resources. In one embodiment, decision engine 308 may be configured to receive a resource request. For example, information handling system 302 may request resources for processing numerical computations, displaying a presentation, launching an application, or any other request. In one embodiment, decision engine 308 may be configured to distribute a resource request into multiple resource requests. For example, decision engine 308 may split a request to display a presentation into a request to run an application for opening the presentation and a request to display the output from the application.

In one embodiment, decision engine 308 may be communicatively coupled to context aggregation engine 306. In some embodiments, decision engine 308 may be configured to analyze or query context information from context aggregation engine 306. In some embodiments, decision engine 308 may be configured to analyze complex context information derived by context aggregation engine 306. For example, decision engine 308 may be configured to utilize various context information (e.g., context information from user profile 322, network profile 324, information handling system profile 326, and/or application profile 328) in processing a resource request. In some embodiments, decision engine 308 may be configured to initiate the aggregation of context information. For example, upon receiving a resource request, decision engine 308 may determine that additional context information would be useful or necessary to make a decision. Accordingly, decision engine 308 may request context aggregation engine 306 provide additional context information. In response, context aggregation engine 306 may aggregate additional context information by, for example, deriving complex context information or processing additional sources for context information.

In some embodiments, decision engine 308 may be configured to distribute resource requests based on context information. For example, if context information indicates a particular information handling system 302 is temporarily disconnected from network 310, decision engine 308 may decide not to distribute a resource request to that information handling system 302. Similarly, if context information indicates a particular information handling system 302 is likely to disconnect from network 310 in the near future, then decision engine 308 may decide not to distribute a resource request to information handling system 302 because of, for example, the expected duration of the resource request. As another example, if context aggregation engine 306 determines that two users are on the same team, then decision engine 308 may assign common computing resources to fulfill resource requests by the users. As another example, decision engine 308 may distribute resources based on current or future location of a user. If a user is physically located in a conference room and requesting resources to display a presentation, then decision engine 308 may be select information handling systems 302 within close proximity to the user to fulfill the resource requests. Similarly, if a user is scheduled for a meeting in a conference room and user requests resources to display a presentation, then decision engine 308 may be select information handling systems 302 within close proximity to the conference room to fulfill the resource requests In some embodiments, decision engine 308 may be configured to distribute resource requests based on optimization criteria. For example, optimization criteria may include criteria (e.g., speed, power, priority, security, reliability, location, etc.) for prioritizing particular resource requests. In some embodiments, the optimization criteria may be specific to particular application or activity. In some embodiments, decision engine 308 may be configured to receive optimization criteria with the resource request. For example, the resource request may indicate prioritization of speed over security for processing the resource request. In some embodiments, decision engine 308 may derive optimization criteria from context information. As an example and not by way of limitation, a computationally intensive application (e.g., MATLAB™ from The MathWorks, Incorporated of Natick, Mass.), may contain an application profile 322 indicating the application is resource intensive. Decision engine 308 may determine optimization criteria to prioritize processing and memory resources over graphics or storage, for example.

Decision engine 308 may be implemented in any suitable manner. For example, decision engine 308 may be implemented by code, analog circuitry, digital circuitry, instructions, libraries, shared libraries, software-as-a-service, functions, applications, scripts, or executables. In some embodiments, decision engine 308 may be part of an information handling system 302. In some embodiments, decision engine 308 may be distributed across one or more information handling systems 302. Although decision engine 308 is illustrated as a single element, decision engine 308 may be implemented through a combination of elements. For example, in one embodiment, decision engine 308 may be distributed across various information handling systems 302 within network 310.

Distributed activity optimization ecosystem 300 may also include action engine 304. In one embodiment, action engine 304 may initiate actions to fulfill a resource request. In some embodiments, action engine 304 may be communicatively coupled to decision engine 308. For example, action engine 304 may communicate directly or via network 310 with decision engine 308. In some embodiments, action engine 304 may be configured to receive an optimized resource request from decision engine 308. In some embodiments, the optimized resource request from decision engine 308 may identify the information handling system 302 to initiate actions to fulfill a resource request. In some embodiments, action engine 304 may initiate actions at information handling system 302 to fulfill a resource request. As an example and not by way of limitation, action engine 304 may initiate the execution of an application on a particular computer system based on an optimized resource request from decision engine 308. The optimized resource request may, for example, identify the information handling system 302 and the application to execute. Action engine 304 may be implemented in any suitable manner. For example, action engine 304 may be implemented by code, analog circuitry, digital circuitry, instructions, libraries, shared libraries, software-as-a-service, functions, applications, scripts, or executables. In some embodiments, action engine 304 may be part of an information handling system 302. In some embodiments, action engine 304 may be distributed across one or more information handling systems 302. Although action engine 304 is illustrated as a single element, action engine 304 may be implemented through a combination of elements. For example, in one embodiment, action engine 304 may be distributed across various information handling systems 302 within network 310.

Although the functionality of context aggregation engine 306, decision engine 308, and action engine 304 are described as separate elements in FIG. 3, the functionality of each of these may be implemented by any suitable portion of distributed activity optimization ecosystem 300.

Figure 4:
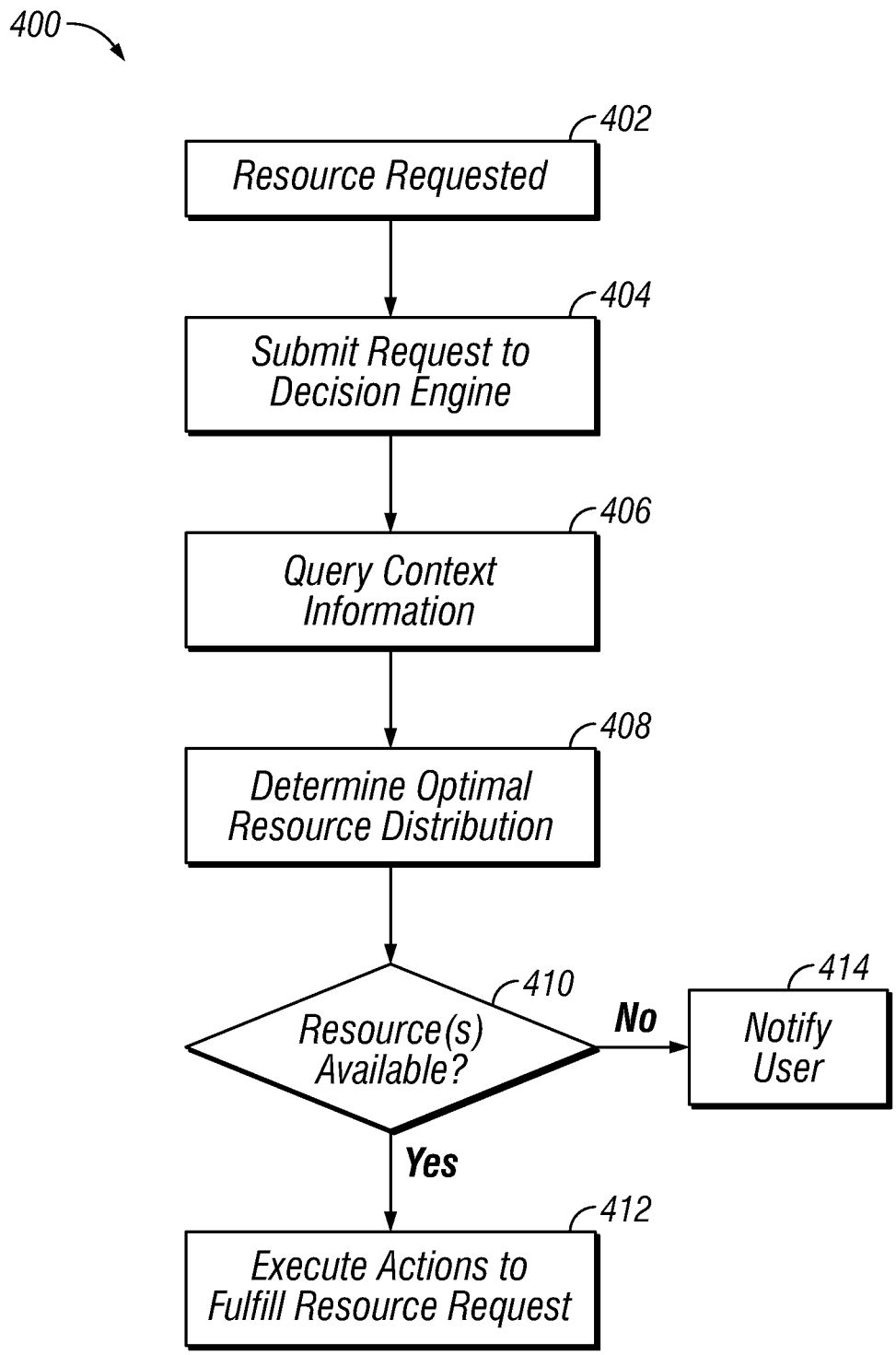
FIG. 4 illustrates an example method for optimizing resources in a distributed resource environment, in accordance with some embodiments of the present disclosure.

FIG. 4 illustrates an example method 400 for optimizing resources in a distributed resource environment, in accordance with some embodiments of the present disclosure. Method 400 may begin at step 402, where a resource is requested. For example, a user of an information handling system 302, as discussed with reference to FIG. 3, may request resources to run a particular application, execute a series of computations, display a graphic, or any other request.

In step 404, the resource request may be submitted to a decision engine for processing. In some embodiments, a resource request may be submitted to decision engine 308, as described in FIG. 3. For example, a user of the information handling system may request a particular application be executed. In turn, the information handling system may submit the request to execute the application to the decision engine.

In order to determine the optimal use of resources, the decision engine may access relevant context information in step 406. In some embodiments, decision engine may acquire context information from a context aggregation engine 306, as described in FIG. 3. Context information may include, for example, information from user profile 302, network profile 324, information handling system profile 326, application profile 328, or any other relevant information. In some embodiments, decision engine may request the context aggregation engine to derive complex context information.

In step 408, the decision engine may determine the optimal distribution of the resource request. In some embodiments, the resource request may be distributed into multiple distributed resource requests. For example, a request to display an application may be split into a request to run the application to open the presentation and another resource request to display the output from the application. In some embodiments, the decision engine may use optimization criteria for optimizing the distribution of resource requests. For example, optimization criteria may include criteria (e.g., speed, power, priority, security, reliability, location, etc.) for prioritizing particular resource requests. In some embodiments, the decision engine may select between multiple available resources based on optimization criteria. To illustrate, a resource request to process confidential information may contain an optimization criteria indicating that security is of highest priority. Decision engine may in turn select between two available information handling systems based on security criteria.

In step 410, method 400 determines whether the resource request may be met. In some embodiments, the decision engine may determine if resources are available to fulfill the resource request. If the requested resource is not available, method 400 proceeds to step 414. In step 414, the user may be notified that the resource request is not capable of fulfillment. In some embodiments, a list of alternatively available resources may be provided to the user. In some embodiments, the user may select from the list of alternatively available resources or submit a new resource request.

If, however, the resource request may be fulfilled, method 400 proceeds to step 412. In step 412, an action engine may initiate actions to fulfill the resource request on the appropriate information handling system. In some embodiments, the resource request may be distributed into multiple resource requests. In such scenarios, the action engine may initiate actions to fulfill the resource requests on the appropriate information handling system(s). In some embodiments, the actions fulfilling a resource request may be executed on one or more information handling systems.

Method 400 may describe distributing resource requests among multiple devices, and may be performed using information handling system 100 (see FIG. 1), performance subsystem 200 (see FIG. 2), and a distributed activity optimization ecosystem 300 (see FIG. 3). It is noted that certain operations described in method 400 may be optional or may be rearranged in different embodiments.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for optimizing resources, comprising:
aggregating information handling system data, network data, user data, and application data from a plurality of network resources into a context information set;
deriving a complex context information set from an association of the information handling system data, network data, user data, and application data in the context information set;
receiving a resource request at an information handling system, the resource request including optimization criteria;
generating an optimized resource request based on the optimization criteria;
identifying a network resource other than the information handling system to perform the optimized resource request based on the context information set and the complex context information set;
executing an action with the network resource to fulfill the optimized resource request; and
updating the context information set based on the action.

2. The method of claim 1, wherein the optimized resource request is a subset of the resource request.

3. The method of claim 1, wherein the optimization criteria is included in the resource request.

4. The method of claim 1, further comprising deriving the optimization criteria from the context information set and the complex context information set.

5. The method of claim 1, further comprising reading the association of the information handling system data, network data, user data, and application data from the context information set.

6. The method of claim 1, further comprising deriving the association of the information handling system data, network data, user data, and application data in the context information set from the context information set and the complex context information set.

7. At least one non-transitory computer readable medium, comprising computer readable instructions which, when executed, cause a processor to:
aggregate information handling system data, network data, user data, and application data from a plurality of network resources into a context information set;
derive a complex context information set from an association of the information handling system data, network data, user data, and application data in the context information set;
receive a resource request at an information handling system, the resource request including optimization criteria;
generate an optimized resource request based on the optimization criteria;
identify a network resource other than the information handling system to perform the optimized resource request based on the context information set and the complex context information set;
execute an action with the network resource to fulfill the optimized resource request; and
update the context information set based on the action.

8. The non-transitory computer readable medium of claim 7, wherein the optimized resource request is a subset of the resource request.

9. The non-transitory computer readable medium of claim 7, wherein the optimization criteria is included in the resource request.

10. The non-transitory computer readable medium of claim 7, wherein the instructions further cause the processor to derive the optimization criteria from the context information set and the complex context information set.

11. The non-transitory computer readable medium of claim 7, wherein the instructions further cause the processor to read the association of the information handling system data, network data, user data, and application data from the context information set.

12. The non-transitory computer readable medium of claim 7, wherein the instructions further cause the processor to derive the association of the first data and the second data in the context information set from the context information set and the complex context information set.

13. An information handling system, comprising:
a processor;
a memory communicatively coupled to the processor;
a resource optimization module resident in the memory and including computer readable instructions which, when executed, cause the processor to:

aggregate information handling system data, network data, user data, and application data from a plurality of network resources into a context information set;

derive a complex context information set from an association of the information handling system data, network data, user data, and application data in the context information set;

receive a resource request at an information handling system, the resource request including optimization criteria;

generate an optimized resource request based on the optimization criteria;

identify a network resource other than the information handling system to perform the optimized resource request based on the context information set and the complex context information set;

execute an action with the network resource to fulfill the optimized resource request; and update the context information set based on the action.

14. The information handling system of claim 13, wherein the optimized resource request is a subset of the resource request.

15. The information handling system of claim 13, wherein the optimization criteria is included in the resource request.

16. The information handling system of claim 13, wherein the instructions further cause the processor to derive the optimization criteria from the context information set and the complex context information set.

17. The information handling system of claim 13, wherein the instructions further cause the processor to read the association of the information handling system data, network data, user data, and application data from the context information set.

18. The information handling system of claim 13, wherein the instructions further cause the processor to derive the association of the information handling system data, network data, user data, and application data in the context information set from the context information set and the complex context information set.

* * * * *